United States Patent [19]

Sargisson et al.

[11] 4,142,365
[45] Mar. 6, 1979

[54] HYBRID MIXER FOR A HIGH BYPASS RATIO GAS TURBOFAN ENGINE

[75] Inventors: Donald F. Sargisson; Daniel J. Lahti, both of Cincinnati, Ohio

[73] Assignee: General Electric Company, Cincinnati, Ohio

[21] Appl. No.: 737,786

[22] Filed: Nov. 1, 1976

[51] Int. Cl.² ............................................. F02K 3/06
[52] U.S. Cl. ................................ 60/204; 60/226 R; 239/265.17; 181/220
[58] Field of Search ................ 60/226 R, 264, 269, 60/262, 204; 181/33 HB; 239/265.17

[56] References Cited

U.S. PATENT DOCUMENTS

| 2,726,091 | 4/1973 | Tontini | 60/264 |
| 2,979,900 | 4/1961 | Hopper | 181/33 HB |
| 3,377,804 | 4/1968 | Wright et al. | 60/262 |
| 3,436,020 | 4/1969 | Duthion et al. | 239/265.17 |
| 3,664,455 | 5/1972 | Duvvuri | 239/265.17 |
| 3,673,803 | 7/1972 | MacDonald | 60/264 |

FOREIGN PATENT DOCUMENTS 997262  9/1951  France ............................ 239/265.17

OTHER PUBLICATIONS

Pearson, Journal of Royal Aeronautical Society, Sep., 1958, p. 662.

Primary Examiner—Robert E. Garrett
Attorney, Agent, or Firm—Robert C. Lampe, Jr.; Derek P. Lawrence

[57] ABSTRACT

A high bypass ratio gas turbofan engine provided with a hybrid mixer for mixing that portion of the bypass stream equivalent to a bypass ratio of substantially two with the core engine hot gas stream. The mixture is passed through a common exhaust nozzle.

7 Claims, 4 Drawing Figures

HYBRID MIXER FOR A HIGH BYPASS RATIO GAS TURBOFAN ENGINE

BACKGROUND OF THE INVENTION

This invention relates to gas turbine engines and, more particularly, to a lightweight, efficient mixed-flow exhaust system for utilization on high bypass ratio gas turbofan engines.

Gas turbine engines of the high bypass ratio variety have been proven to demonstrate greater efficiency and higher performance than their turbojet counterparts, particularly in subsonic transport applications. In engines of this type, a core engine gas generator is surrounded by a generally concentric annular bypass duct which carries relatively cool air pressurized by an upstream fan. The bypass ratio of such a turbofan engine is determined by the measure of air flowing through the bypass duct compared to that which flows through the core engine, and the most recently developed commercially available high bypass ratio turbofan engines have bypass ratios in the order of 4 – 7:1. Generally, the bypass flow and core flow are discharged through separate concentric coannular nozzles to generate two additive components of propulsive thrust. In some advanced engines, it has been proposed to mix the two flows together and to discharge the mixture through a common nozzle, since it has been recognized that a propulsive thrust benefit can be obtained in this manner. And, in order to insure that the concentric flow streams are effectively mixed, they must be passed through a flow mixer such as of the well-known multilobed variety prior to being discharged through an exit nozzle.

The problem associated with such mixers is that their propulsive thrust benefits are often outweighed by increases in system hardware cost, complexity and weight (an important design consideration in aircraft applications). Previous efforts on mixer designs for high bypass ratio gas turbofan engines have concentrated on schemes which mixed substantially the total flow of the bypass and core engine streams. For typical turbofan engines of bypass ratios 4 or higher, the mixers became so heavy and the pressure losses such as those due to scrubbing drag and mixing became so large that they were dropped as viable contenders for thrust and performance augmentation.

However, the quest for greater efficiency and improved performance goes on as aircraft become heavier and their operators plan for longer range routes. Consider for a moment that a one percent increase in thrust is equivalent to 500 pounds of thrust in an engine of the 50,000—pound class. Thus, if a higher thrust can be obtained for a given throttle setting or, conversely, the same thrust can be obtained at a lower throttle setting, significant savings in fuel costs can result. Therefore, it becomes well worth the search to find even small improvements and gains in overall engine thrust. However, common sense dictates that these improvements be practical from both the mechanical and economic points of view. For example, there are thousands of gas turbine engines in operation today, many of them being of the high bypass ratio variety. Preferably, any component improvement program would entail only minor, low-cost modifications to these existing engines.

SUMMARY OF THE INVENTION

Accordingly, it is the primary object of the present invention to take advantage of the well-known concept of exhaust flow mixing, but to utilize the concept in such a manner that its effect is optimized in a high bypass ratio gas turbofan engine.

It is another object of the present invention to provide a mixed flow exhaust system for high bypass ratio gas turbofan engines which is of such a lightweight and efficient configuration that the improvements in thrust are not offset by the increased weight and drag (pressure losses) of the system.

It is yet another object of the present invention to provide a method of mixing the coannular exhaust stream of a high bypass ratio gas turbofan engine so as to improve the performance of the exhaust system as a whole.

These and other objects and advantages will be more clearly understood from the following detailed description, drawings and specific examples, all of which are intended to be typical of rather than in any way limiting to the scope of the present invention.

Briefly stated, the above objectives are accomplished in a high bypass ratio gas turbofan engine wherein only a portion of the bypass flow equivalent to a bypass ratio of substantially 2 is mixed with the core engine hot exhaust gas stream and discharged through a common nozzle. The remaining bypass flow passes through an outer coannular nozzle with a more forward exit plane. Irrespective of the engine bypass ratio, the mixer is designed so as to entirely mix only that amount of flow equivalent to a bypass ratio of 2. Such a hybrid mixer can readily be adapted to existing engines as by bolting the mixer onto the core engine turbine rear frame. In the preferred embodiment, the mixer is disposed well downstream of the fan bypass duct exit nozzle and captures that portion of the supersonic fan bypass stream equivalent to a bypass ratio of 2. The mixer is contoured internally so as to diffuse the bypass flow portion to subsonic velocity prior to mixing with the core engine hot gas stream.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

DESCRIPTION OF THE PREFERRED EMBODIMENT

Figure 1:
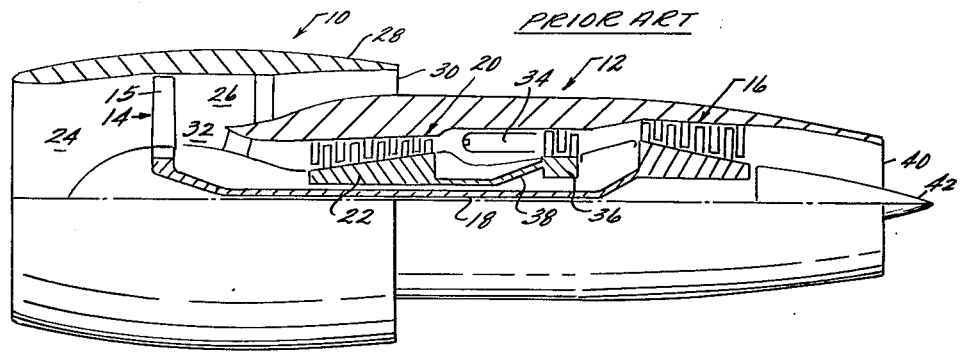
FIG. 1 diagrammatically depicts in partial cutaway a typical prior art high bypass ratio gas turbofan engine.

Referring to the drawings wherein like numerals correspond to like elements throughout, reference is first directed to FIG. 1 wherein a typical prior art high bypass ratio gas turbofan engine depicted generally at 10 is diagrammatically shown. This engine may be considered as comprising generally a core engine (or gas generator) 12, the fan assembly 14 including a stage of rotatable fan blades 15, and a low pressure fan turbine 16 which is interconnected to the fan assembly 14 by shaft 18. The core engine 12 includes an axial flow compressor 20 having a rotor 22. In operation, air enters inlet 24 and is initially compressed by fan assembly 14. A first portion of this compressed air enters the fan bypass duct 26 defined, in part, by core engine 12 and a circumscribing fan nacelle 28 and discharges through a fan nozzle 30 to generate the major portion of the propulsive thrust. A second portion of the compressed air enters core engine inlet 32, is further compressed by the axial flow compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass to and drive the fan turbine 16 which, in turn, drives the fan assembly 14. The remainder of the propulsive thrust is generated by the discharge of combustion gases from a core engine nozzle 40 defined, in part, by nozzle centerbody 42.

As has been previously mentioned, bypass ratio is defined as the ratio of the measure of air flowing through the bypass duct 26 divided by the measure of air entering core compressor 20 through inlet 32. As is well known, the propulsive efficiency of a turbofan engine generally increases in direct proportion to its bypass ratio and current high bypass engines have bypass ratios in the order of 4 – 7:1. Considering, for example, a bypass ratio of 6, the airflow division results in approximately 15 percent thrust being developed at the core engine exhaust nozzle 40 and 85 percent at the fan bypass duct nozzle 30.

It has been discovered that if the bypass flow is mixed with the core engine hot gas flow, and the mixture exhausted through a common nozzle, an increase in engine thrust can be obtained. Engines of this variety incorporate mixers of the multilobe type, commonly referred to as "daisy" mixers. Such a mixer is generally described in U.S. Pat. No. 3,377,804 – J. D. Wright et al, which is assigned to the assignee of the present invention and the specification of which is incorporated herein by reference. When such mixers are used in gas turbofan engines with bypass ratios of 4 or more, only a portion of the fan bypass flow can be effectively mixed with the core hot gas flow because of the rapidly increasing mixer weight and system pressure drops when mixing efficiencies greater than 70 percent are the design objective. (Since the mixing process is near ideal, mixing efficiency is defined as the ratio of the actual to the ideal thrust gain.) In other words, on very high bypass ratio engines, if it is desired to mix all of the bypass flow with all of the core flow, the mixer would have to be very large because of the great bypass annulus height which must be spanned. This leads to larger pressure losses, and also results in a very heavy mixer. Thus, the thrust improvements are offset by increases in weight and increased pressure losses. Therefore, smaller mixers which are limited to mixing smaller amounts of the bypass flow are more reasonable contenders.

Figure 2:
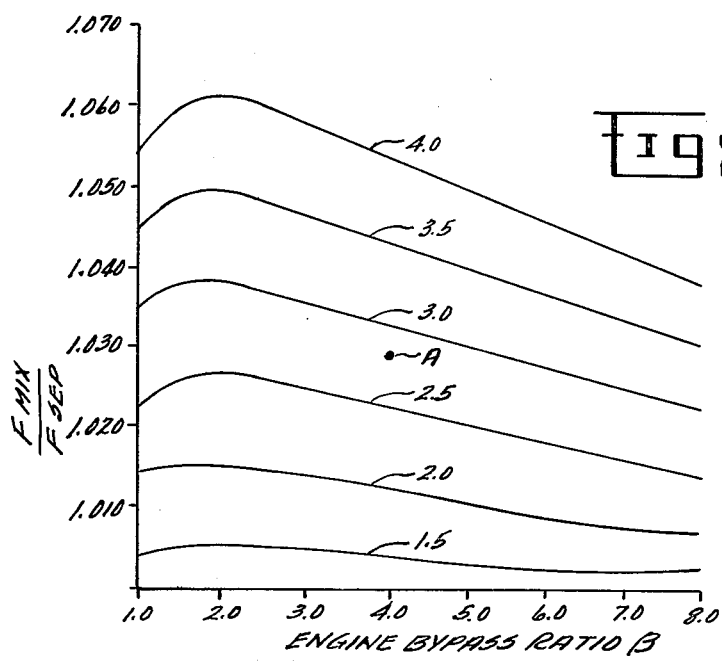
FIG. 2 graphically depicts the ratio of thrust for mixed versus separated exhaust flow streams as a function of bypass ratio for various temperature ratios of the core engine and bypass flows.

Referring now to FIG. 2, there is depicted in graphical form the ratio of thrust for mixed versus separated exhaust flow streams as a function of bypass ratio for various temperature ratios of the core engine flow and bypass flow. The ordinate represents the ratio of thrust when the coannular flow of a gas turbofan engine are mixed, $F_{mix}$, (and passed through a common nozzle) divided by the sum of the thrusts of the separate flows, $F_{sep}$. The abscissa represents the bypass ratio, $\beta$, of the mixed flows (i.e., the measure of that portion of the bypass flow actually mixed divided by the measure of core engine hot gas flow). The curves represent lines of constant temperature ratio, the ratio of the core engine hot gas exhaust flow total temperature divided by that of the bypass flow. Essentially, the higher this temperature ratio, the greater the thrust gain due to mixing at a given value of bypass ratio, $\beta$. FIG. 2 does not include the effects of pressure losses due to mixing and is based on 100 percent mixing efficiency.

Consider the following relationships in a typical gas turbofan engine:

$$\frac{F_{mix}}{F_{sep}} = \frac{(W_{core} + W_{bp})V_{mix}}{W_{core}V_{core} + W_{bp}V_{bp}} = \frac{(1 + \beta)V_{mix}}{V_{core} + \beta V_{bp}} \quad (1)$$

where
$W_{core}$ = measure of core engine flow
$W_{bp}$ = measure of bypass flow
$V_{core}$ = velocity of core engine flow
$V_{bp}$ = velocity of bypass flow
$V_{mix}$ = velocity of mixed flows Since fluid velocity may be approximately by the square root of the total temperature (T) of the flow, equation (1) results in:

$$\frac{F_{mix}}{F_{sep}} \approx \frac{(1 + \beta)\sqrt{T_{mix}}}{\sqrt{T_{core}} + \beta \sqrt{T_{bp}}} = \frac{(1 + \beta)\sqrt{\frac{T_{mix}}{T_{core}}}}{1 + \left[\beta \sqrt{\frac{T_{bp}}{T_{core}}}\right]} \quad (2)$$

also, $$T_{mix} \approx \frac{W_{core}T_{core} + W_{bp}T_{bp}}{W_{core} + W_{bp}} = \frac{T_{core}W_{core}\left[1 + \frac{W_{bp}}{W_{core}}\frac{T_{bp}}{T_{core}}\right]}{W_{core}\left[1 + \frac{W_{bp}}{W_{core}}\right]} \quad (3)$$

therefore, $$\frac{T_{mix}}{T_{core}} \approx \frac{1 + \left[\beta \frac{T_{bp}}{T_{core}}\right]}{1 + \beta} \quad (4)$$

For a representative gas turbofan engine having a bypass ratio of 4 and wherein $(T_{bp}/T_{core}) = (1/2.8)$, equations (2) and (4) yield a ratio of $(F_{mix}/F_{sep}) = 1.0279$ (see point A, FIG. 2). Thus, a 2.79 percent gross thrust improvement could be obtained. This number is significantly higher, as can be appreciated, if the real world effects such as ram drag are not included.

The interesting fact that is clearly depicted in FIG. 2 is that all of the temperature ratio curves reach a maximum value at a bypass ratio of approximately 2, at least for all practical ranges of temperature ratio. Accordingly, there is presented in FIG. 3 an engine 10' similar to that of FIG. 1, but modified in accordance with the present invention to take advantage of the aforementioned phenomenon. Therein, a portion of the bypass flow equivalent to a bypass ratio of 2, after exhausting from fan nozzle 30, is captured by inlet 44 of a hybrid mixer 46 formed, in part, by an annular shroud 47 disposed in spacial relationship with core engine 12. The bypass flow portion is mixed with the high energy combustion gases of the core engine in a multilobe chuted mixer 48, the resulting gas mixture exhausted rearward through a common nozzle 50 defined, in part, by a slightly modified centerbody 52 to generate a higher level of propulsive thrust. The terms "hybrid mixer" and "hybrid mixing means" are used herein since there is a combination of bypass flow entering multilobe mixer 48 and a portion of the bypass flow which bypasses mixer 48 in the normal manner of a gas turbofan engine.

If, on the other hand, a conventional mixed flow system were employed (the objective being to mix all of the bypass flow with the core engine flow) a higher thrust gain would be realized even at a 70 percent mixing efficiency because substantially more of the flow would be mixed (perhaps three times as much). However, some of this benefit would be lost and offset by the increased system weight and larger internal pressure losses. The smaller hybrid mixer of the present invention produces essentially the same net thrust increase after compensating for internal losses but does it without the large weight increases and without large modifications to the overall engine system. The chuted, multilobed mixer 48 can easily be retrofitted to existing engines as by bolting it to the rear frame of the low pressure turbine rotor 54. The rear frame 56, as is well known, typically provides structural support for the rear of the low pressure turbine rotor and is a practical primary structure attachment point for the mixer 48.

Annular shroud 47 is supported in its proper spacial relationship with core engine 12 by means of a plurality of aerodynamically contoured struts 58 which are preferably mounted to the low pressure turbine rear frame 56. Since the bypass flow exiting nozzle 30 is supersonic relative to the nozzle, the shroud is provided with a supersonic inlet 44 at its leading edge to capture that amount of bypass flow equivalent to a bypass ratio of 2. The inner surface 60 of the shroud and outer surface 62 of core engine 12 are so contoured as to diffuse the high Mach number bypass flow entering inlet 44 to a preferably subsonic Mach number suitable for mixing with the subsonic core engine hot exhaust gas flow.

With regard to surfaces 60 and 62, past mixer and core centerbody designs have utilized either constant or converging area distribution to ensure separation-free flow. Thus, centerbodies as typified by centerbody 42 of FIG. 1 were relatively large and heavy. It can be shown theoretically that the pressure loss through the mixer is minimized when the flow is made to diffuse, but not separate. However, if separation does occur, the losses will be higher than those which occur in an accelerating (converging area) flow. Designers of the past were not willing to take such a risk because accurate methods were not available for confidently defining the complex mixer passages without separation. However, current methods are capable of such a task, and can result in smaller and lighter centerbodies, as represented by centerbody 52 of FIG. 3, and higher performance mixers.

Figure 3:
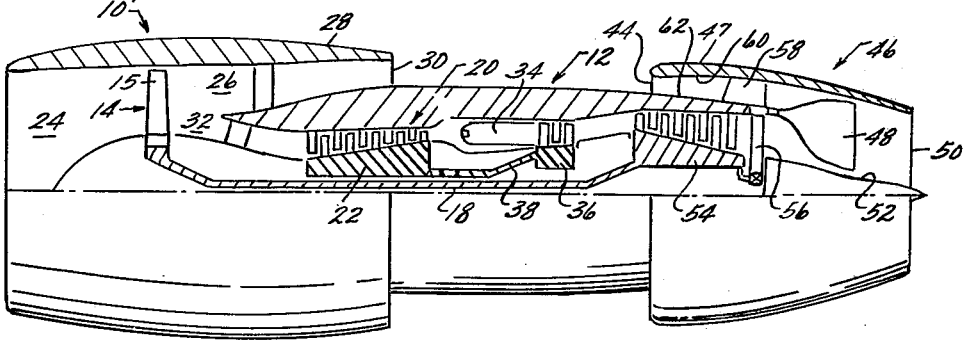
FIG. 3 is a view depicting the engine of FIG. 1 modified in accordance with the present invention.

The engine of FIG. 3 has another subtle yet significant advantage over a high bypass ratio engine having the fan nacelle extended fully aft and being provided with a full annulus mixer. In particular, the drag loads that are produced in flight due to the shroud 47 are directly reacted by the main strength element of the hybrid mixer, the carcass of the core engine through turbine rear frame 56. Conversely, in the extended nacelle case, the installed thrust load on the engine would be reacted on the engine main thrust mount which is usually offset from the center of thrust of the engine, thereby resulting in the imposition of additional bending moments and associated bending stresses and deflections on the engine. These additional bending stresses and deflections are not present in the engine of FIG. 3 where the shroud 47 and mixer 48 are carried by the core engine since the loads associated therewith are transferred to the engine uniformly around the circumference of the engine, thereby reducing the net reactive thrust load on the engine and permitting a less hefty structure at the engine main thrust mount. This mechanism is explained in greater detail in copending U.S. Pat. application Ser. No. 572,647 — Tuten et al, now U.S. Pat. No. 4,022,018, which is assigned to the assignee of the present invention and the disclosure of which is incorporated herein by reference.

Figure 4:
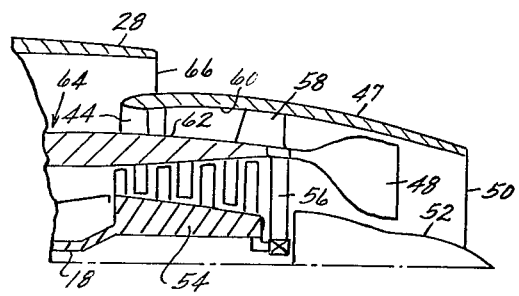
FIG. 4 is an enlarged view of an engine similar to that of FIG. 3 depicting an alternative embodiment of the present invention.

An alternative embodiment of the present invention is shown in FIG. 4 in which only the hybrid mixer portion of the engine is shown in an enlarged view. Therein, an engine with a relatively shorter core engine gas generator 64 and a circumscribing nacelle 28 is shown. Here the mixer shroud 47 extends forward within the aft end of the nacelle 28 and is generally concentric therewith. Thus, the subsonic flow within the bypass duct is split into two portions, one exiting through fan nozzle 66 at supersonic velocity and the remainder, having a bypass ratio of 2 with respect to the core engine, entering inlet 44 at subsonic velocity. In this configuration, the amount of diffusion required through the hybrid mixer is substantially less than that in FIG. 3 since the mixer bypass flow is picked up at subsonic rahter than supersonic velocity prior to the fan nozzle exit. Such a configuration loses some of its advantages when a long length core engine gas generator is used. In particular, since the shroud length is longer, the structure weighs more. Also, the outer cowling of the core engine must be modified to a contour compatible with the shroud to produce a proper internal area distribution, and the fan thrust reversers (not shown), normally located in the aft end of nacelle 28, must be changed. In essence, the advantage of a simple "bolt on" retrofit of existing engines may be lost, at least in part. Thus, the embodiment of FIG. 3 is preferred with a core engine which is of relatively long length.

It will become obvious to one skilled in the art that certain changes can be made to the above-described invention without departing from the broad inventive concepts thereof. For example, it is clear from FIG. 2 that the optimum bypass ratio for the hybrid mixer is not exactly 2 for all values of temperature ratio. By claiming a bypass ratio of substantially 2, it is meant to embrace small deviations from a value of 2 while still remaining within the novel concepts embraced by the present invention. Furthermore, many methods of mounting the subject hybrid mixer to a high bypass turbofan engine may be found, and the suggested concept of mounting to the low pressure turbine rear frame is merely suggestive of one such possibility. Additionally, this invention is equally applicable to asymmetric as well as axisymmetric, nozzles. It is intended that the appended claims cover these and all other variations in the present invention's broader inventive concepts.

Having thus described the invention, what is claimed as novel and desired to be secured by Letters Patent of the United States is:

1. In a gas turbine engine including a core engine, a nacelle circumscribing the core engine in radial spaced relationship to define a bypass duct therebetween, and a fan within the nacelle for pressurizing air, a first portion of which enters the core engine to generate a hot gas stream and a second portion of which enters the bypass duct as a bypass stream, the improvement comprising a shroud circumscribing the core engine in radial spaced relationship to define an annulus therebetween, the inlet to said annulus being disposed downstream of said nacelle and sized to capture that portion of the bypass stream equivalent to a bypass ratio of substantially two and a mixer for mixing the captured portion with the hot gas stream.

2. The invention as recited in claim 1 wherein said mixer is of the multilobed variety.

3. In a gas turbine engine including a core engine, a nacelle circumscribing the core engine in radial spaced relationship to define a bypass duct therebetween, and a fan within the nacelle for pressurizing air, a first portion of which enters the core engine to generate a hot gas stream and a second portion of which enters the bypass duct as a bypass stream, the improvement comprising a shroud circumscribing the core engine in radial spaced relationship to define an annulus therebetween having an inlet disposed within said bypass duct and sized to capture that portion of the bypass stream equivalent to a bypass ratio of substantially two and a mixer for mixing the captured portion with the hot gas stream, and an outlet termination downstream of said nacelle.

4. The invention as recited in claim 3 wherein said bypass duct terminates in an exit nozzle and said annulus inlet is upstream of the bypass duct exit nozzle.

5. In a high bypass ratio gas turbofan engine having a core engine and a bypass duct for generating a hot gas stream and a generally coannular bypass stream, the improvement comprising a shroud terminating downstream of the bypass duct for dividing the bypass stream into two portions, one portion equivalent to a bypass ratio of substantially two which is passed to a mixer wherein it is mixed with the hot gas stream and thereafter passed through a common exhaust nozzle and the other portion of which is routed around the shroud as a stream coannular with said mixed bypass stream portion.

6. In a method of operating a gas turbine engine including a core engine for generating a hot gas stream, a bypass duct generally concentric with the core engine for the passage of a bypass stream, and a shroud termination downsteam of the bypass, the steps of passing only a portion of the bypass stream equivalent to an engine bypass ratio of substantially two through an annulus formed between the shroud immersed in the bypass stream and the core engine, mixing the flow within the shroud with the core engine hot gas stream, and passing the remainder of the bypass flow around the outside of the shroud.

7. A gas turbofan engine comprising a core engine for generating a hot gas stream, a bypass duct around said core engine for the passage of a bypass stream, a generally cylindrical shroud around said core engine termination downstream of said bypass duct and immersed in the bypass stream forming an annulus between said shroud and said core engine sized to pass only a portion of the bypass stream equivalent to an engine bypass ratio of substantially two, and a mixer within said shroud for mixing the bypass flow within said annulus with the core engine hot gas stream.

* * * * *